United States Patent Office 3,483,482
Patented Dec. 9, 1969

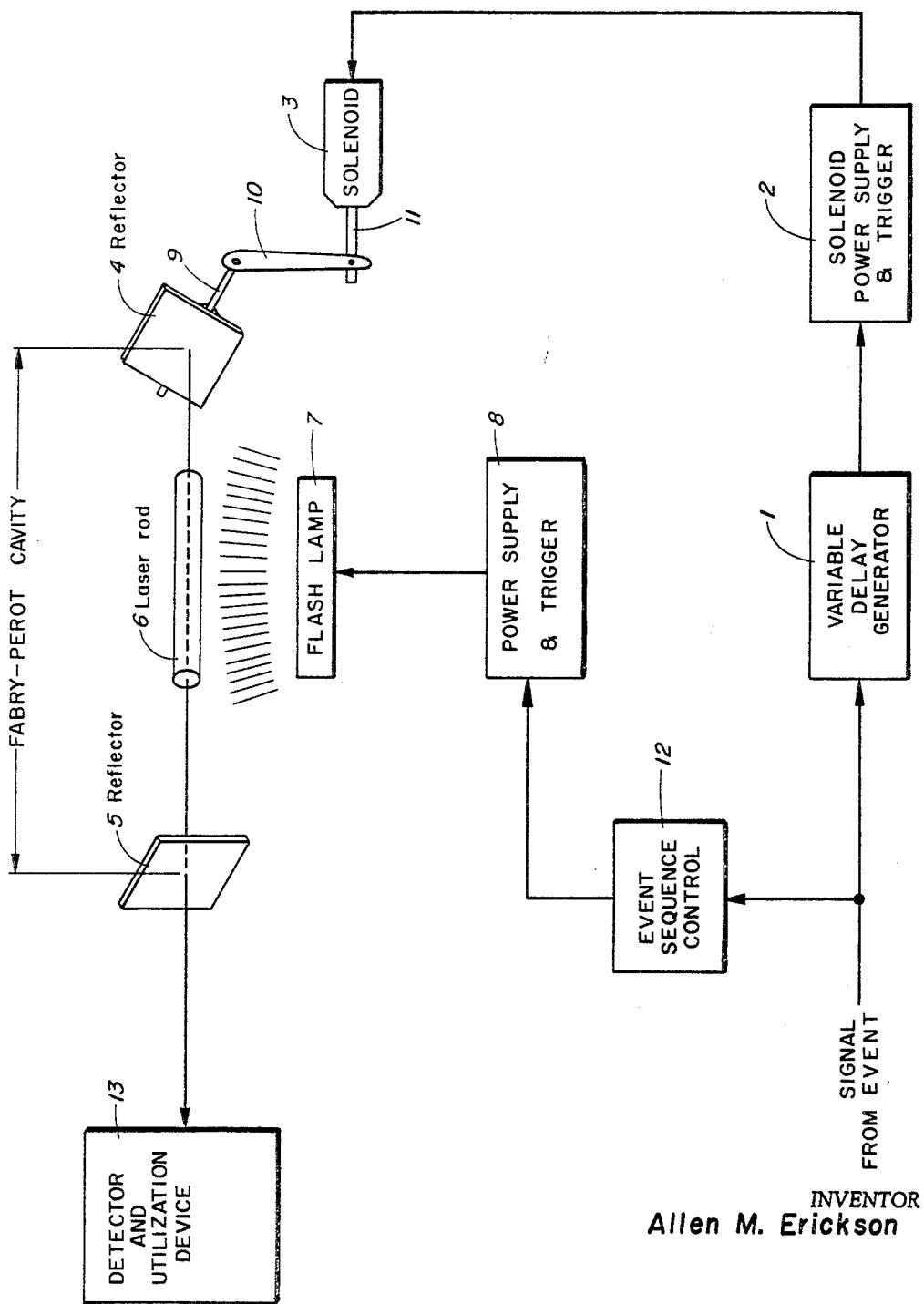

3,483,482
ON CALL SWITCHING SYSTEM FOR LASER
Allen M. Erickson, Silver Spring, Md., assignor to the United States of America as represented by the Secretary of the Navy
Filed May 9, 1966, Ser. No. 548,806
Int. Cl. H01s 3/18
U.S. Cl. 331—94.5                             8 Claims

ABSTRACT OF THE DISCLOSURE

A laser system in which an event signal triggers a flash lamp for exciting a laser rod. The same signal acts through a time delay network to position a reflector, completing a Fabry-Perot cavity which causes lasing to occur.

---

The invention described herein may be manufactured and used by or for the Government of the United States of America for governmental purposes without the payment of any royalties thereon or therefor.

The present invention relates to synchronizing of solid state switching apparatus and more particularly to a pulse type switching circuit for synchronously triggering the components of a solid state laser.

In the field of laser switching, there has been a growing need for a reliable triggering apparatus which would render feasible the synchronization of all components of a laser system for high peak power and maximum operating efficiency. Heretofore, it has been extremely difficult to achieve a high degree of switching efficiency due to extensive cavity losses in the Fabry-Perot cavity of the laser being switched.

One of many possible exemplifications of the above noted prior art problems of synchronous switching is encountered in the field of Schlieren photography, wherein, it has heretofore been the general practice to employ Kerr cell switching systems, "Passive" Q switches, and "Rotating Prism" switching systems to perform the function of fast switching for event synchronization. Although such devices have served the purpose, they have not proved entirely satisfactory under all conditions of service for the reasons that considerable difficultty has been encountered in each of the above noted switching systems as hereinafter described.

The term "Q switching" encompasses all solid state pulse type switching systems, but as utilized hereinafter its use will denote the specific application to solid state laser switching apparatus.

A present day Kerr cell switching arrangement, as utilized in a Schlieren system, will satisfy the basic requirement of event synchronization but will have high cavity insertion loss and will require intricate high voltage electronic circuity which is generally not desirable. Reliability of the switching arrangement will be very seriously jeopardized by an environment contaminated with dust, lint, varying humidity conditions, etc. such that high voltage terminals and connections will collect ionized foreign particles from the air, requiring a considerable amount of time-consuming maintenance.

A "Passive" Q switching cell is not entirely suitable for use in Schlieren photography because of excessive switching variations. At nominal model velocities of 20,000 feet per second, acceptable switching jitter should be no more than twenty microseconds. The passive cell, using liquid dye, has a switching variation well in excess of this figure. Additional difficulties arise due to fatigue or deterioration of the liquid dye and thus a gradual change in switching delay occurs through use.

A "Rotating Prism" switching system is somewhat analogous to the solenoid driven reflector system described in the immediate invention with the exception that the rotating prism is not an "on call" system. An "on call" switching system is a system which is constantly on standby or in a state capable of being instantly triggered at any desired moment. A "Rotating Prism" switching system does not, for instance, lend itself to synchronization with other test events as needed by Schlieren photography in a test range. A rotating prism is a very delicate mechanism and consists of a prism attached to the shaft of a rotating armature. A very delicate balance arrangement is required in order to insure a vibration free system. A small chip off the prism or even slight wear of the bearings will upset the balance of the system and make likely the shattering of the prism and danger to the attendants. It is readily seen that a rotating prism system will not function in the capacity of an "on-call" system for synchronization with other events. Assuming that the prism is mounted on the shaft of an armature with a rotational speed of 12,000 r.p.m. one revolution of the shaft will require 5 milliseconds. Now if one considers the nominal velocity of a model in an areoballistic range to be 20,000 feet per second, the model will travel 20 feet per millisecond. If the model is fired immediately upon the prism rotating past the desired synchronizing position, the prism must rotate through a full 360 degrees before synchronization is again possible and during this period of 5 milliseconds the model will have traveled 100 feet down the aeroballistic range. The above description has been set forth to exemplify the critical problem of providing an "on-call" system for synchronizing a switching system at a desired time with some external event.

An object of the present invention is the provision of means for Q switching a solid state laser with high cavity efficiency and good firing reliability.

Another object is to provide simplified, reliable electronic switching apparatus which will operate effectively and efficiently with a smaller voltage requirement than has heretofore been possible.

A further object of the invention is the provision of an improved and simplified light source for a Schlieren photographic system.

Still another object is to provide circuitry for synchronizing the flash of a light source with the components of a Schlieren system.

Yet another object of the present invention is to provide a reliable "on-call" system which is in a continuous state of readiness and which is capable of performing precise synchronization of several events.

One aspect of this invention is to provide an "on-call" Q switch for a solid state laser which embraces all the advantages of similarly employed prior art devices without the attendant disadvantages. To attain this, the present invention contemplates a unique arrangement of a reflector mounted on a rotatable shaft which is actuatable by the armature of a solenoid whereby the reflector is rotated through a small arc and thus rapidly aligned with the remainder of a laser cavity for effecting both laser switching and event synchronization.

The exact nature of this invention as well as other objects and advantages thereof will be readily apparent from consideration of the following specification relating to the annexed drawing.

Referring now to the solitary figure of the drawing, there is shown an adjustable reflector system utilized to synchronize the alignment of a rotatable mirror 4 to the optical cavity of a laser rod 6 for stimulated emission therein. As is well known in the art, ordinary ruby lasers are excited for periods of a few milliseconds, with the length of the excitation period being determined by the duration of an exciting flash provided by a source such as a flash lamp 7 as shown adjacent to laser rod 6. In actual practice, the laser rod is generally surrounded by the coils of a helical flashlamp, however, other geometries that provide high intensity irradiation also may be employed. The flash lamp is actuated by discharging the stored charge of a condenser bank therethrough. The discharge may be initiated by a signal from an event sequency control unit 12, if control functions other than laser control are desired, or it may be initiated directly by a signal indicative of some desired external event. Fluorescence of laser rod 6 begins immediately after irradiation from the flash lamp 7 commences. Stimulated emission of the laser rod does not begin immediately upon the triggering of flash lamp 7, but occurs approximately 0.5 to 0.7 millisecond later. As a result of spontaneous and stimulated emission, light is generated within the laser rod 6. Two reflectors 4 and 5 are adjusted to a nearly perfect parallel orientation upon the triggering of a solenoid 3 in response to the occurrence of some particular external event. If only the light rays traveling perpendicularly between the two reflectors are considered, then any light lost during reflections therebetween will be due to imperfect reflection from the reflector surfaces. In order to obtain a power output from the laser, one of the reflectors is made partially transmitting. Reflectors 5 is a partial reflector and reflector 4 is as near a perfect reflector as can be obtained. The output from the laser may be utilized in numerous diverse applications, one example being Schlieren photography. A detector and utilization device 13 is shown in the drawing with the laser output incident thereon. Said detector and utilization device, in the case of Schlieren photography, could be a film plate with its associated apparatus. A typical set of mirrors which will function effectively in the immediate invention is a 55% partial reflector 5 and a 99% reflector 4.

To effect partial transmission, a mirror 4 is mounted on a small shaft 9 which is spring loaded (not shown). Adjustment of mirror 4 is initiated by the slug 11 of solenoid 3 through an arm 10 which is rigidly attached at the other end to slug 11. Solenoid 3 may be any conventional high speed electromechanical device capable of actuating the mechanical linkage of the adjustable reflector upon demand. A suitable energizing source such as a solenoid power supply and trigger 2 is utilized to actuate the solenoid 3, whereby reflector 4 is rotated through a small angle of about 15 degrees for alignment with stationary reflector 5. It is not desirable to have reflector 4 in continuous alignment with reflector 5 as any inadvertent triggering of flash lamp 7 would falsely indicate the existence of a desirable synchronizing condition.

Under actual operating conditions, it is fairly evident that the length of time required for alignment of reflector 4 through the mechanical linkage connected to the solenoid 3 would be greater than the period of time required for the flash lamp 7 to fire. However, since an additional period of time is required after flash lamp 7 fires for laser rod 6 to reach a state of stimulated emission (about .7 millisecond) then, due to some external stimulus, an input signal will activate the adjustable reflector mechanism. The spring loaded reflector 4 will be forced back into its original position before stimulated emission of laser rod 6 occurs, such that no light beam is emitted from the laser. Now if a variable delay generator 1 is utilized to delay the solenoid triggering signal a predetermined amount, then the alignment of reflector 4 will occur at the proper time for production of a laser output which will be indicative of the occurrence of a particular external event.

One example of the many applications of this invention is its use in range photography for realizing nanosecond exposure of Schlieren and shadowgraph films and more particularly as a simplified laser light source for a double pass Schlieren system in a pressurized aeroballistic range.

Variations of the instant invention (not shown in the drawing) can also be realized by mounting a reflector on a high speed relay armature and subsequently dumping a large energy pulse into the triggering relay. To achieve fast armature movement the coil electrical characteristics should be matched to the pulse power source so that the energy transfer would take place during the armature cycle. The armature should be rid of all excess mass not needed to rigidly support the reflector. Another variation may be realized by mounting a reflector on a strap of magnetic material and bending the strap by mechanical means or with a magnetic field. Thus, the reflector will be bent or distorted from an optically flat condition as the strap is bent. When the distorting strain is relieved, both the strap and mirror will return to their original unstrained condition. As the mirror achieves optical flatness it becomes an ideal cavity reflector and thus switches the laser.

The principles herein utilized can be applied to many present uses of lasers including surgery, drilling and welding operations, counter measures, target illumination, laser radar, underwater photography, and many other applications that require high peak beam power both with and without external synchronization (on call) requirements.

Various modifications are contemplated and may obviously be resorted to by those skilled in the art without departing from the spirit and scope of the invention, as hereinafter defined by the appended claims, as only a preferred embodiment thereof has been specifically disclosed.

What is claimed is:

1. An "on-call" laser switching apparatus for a laser having a light radiating means and a Fabry-Perot cavity including a reflector system formed of a pair of reflectors and a solid state laser rod for emitting radiation upon stimulation from said light radiating means;
   means for detecting an external event and for activating said light radiating means upon the occurrence of an input signal indicative of said particular external event;
   means for adjusting at least one reflector of said reflector system to provide alignment of said pair of reflectors, whereby lasing action by said laser rod may be effected; and
   means connected to said reflector adjusting means and also responsive to said input signal for said light radiating means for synchronizing the reflector alignment to a particular portion of the radiating period of said light radiating means.

2. Switching apparatus as set forth in claim 1, wherein said reflector system includes a stationary reflector and an adjustable reflector.

3. Apparatus as set forth in claim 2, wherein said stationary reflector is a partial reflector and said adjustable reflector has a reflectivity of at least 99 percent.

4. Apparatus as set forth in claim 2, wherein said light means is a high intensity flash lamp and said means for activating said light means includes a power supply for said flash lamp and a trigger arrangement responsive to said input signal whereby synchronization between alignment to the reflector system and the flash of the flash lamp may be effected.

5. Apparatus as set forth in claim 4, wherein said means for adjusting said adjustable reflector comprises;
   an electromechanical device;
   a mechanical linkage connected between the adjustable reflector and said electromechanical device; and
   a trigger circuit for actuating said electromechanical device upon demand.

6. Apparatus as set forth in claim 5, wherein said electromechanical device is a high speed solenoid having the slug pivotally attached to one end of the mechanical linkage for rotating the adjustable reflector through a small angle for alignment with the stationary reflector.

7. Apparatus as set forth in claim 4, wherein said means for synchronizing a portion of the reflector adjustment period to a period of radiation of said light means includes a delay means for delaying the input signal a predetermined amount, whereby actuation of the adjustable reflector system occurs at the desired time for synchronization with the desired portion of the flash period of the light source.

8. Apparatus as set forth in claim 7, wherein said stationary reflector is a partial reflector for effecting a laser output.

References Cited
UNITED STATES PATENTS

| | | | |
|---|---|---|---|
| 3,041,936 | 7/1962 | Hull | 350—150 |
| 3,123,714 | 3/1964 | Chope | 250—199 |
| 3,192,825 | 7/1965 | Courtney-Pratt et al. | 350—168 |
| 3,308,396 | 3/1967 | Comstock et al. | 331—94.5 |

JEWELL H. PEDERSEN, Primary Examiner

T. MAJOR, Assistant Examiner